US012287997B2

(12) United States Patent
Martin

(10) Patent No.: US 12,287,997 B2
(45) Date of Patent: Apr. 29, 2025

(54) CLOUD-BASED PRINTING MANAGING SYSTEM AND METHOD

(71) Applicant: Kyocera Document Solutions Inc., Osaka (JP)

(72) Inventor: Michael Ong Martin, Pacheco, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/133,222

(22) Filed: Apr. 11, 2023

(65) Prior Publication Data
US 2024/0345787 A1 Oct. 17, 2024

(51) Int. Cl.
*G06F 3/12* (2006.01)
*G06K 15/02* (2006.01)

(52) U.S. Cl.
CPC ............ *G06F 3/129* (2013.01); *G06F 3/1203* (2013.01); *G06F 3/126* (2013.01)

(58) Field of Classification Search
None
See application file for complete search history.

(56) References Cited

U.S. PATENT DOCUMENTS

| | | | | |
|---|---|---|---|---|
| 7,777,906 B2 * | 8/2010 | Namikata | ............ | H04N 1/0009 358/1.14 |
| 9,007,620 B2 * | 4/2015 | Park | ...................... | G06F 3/1285 358/1.9 |
| 2009/0033976 A1 * | 2/2009 | Ding | ...................... | G06F 3/1226 358/1.15 |
| 2011/0037995 A1 * | 2/2011 | Wang | .................... | G06F 3/1205 358/1.15 |
| 2012/0194850 A1 * | 8/2012 | K | .......................... | G06F 3/1288 358/1.15 |
| 2013/0301080 A1 * | 11/2013 | Nakata | .................. | G06F 3/1204 358/1.15 |
| 2014/0036287 A1 * | 2/2014 | Byer | ...................... | G06F 3/1253 358/1.13 |

FOREIGN PATENT DOCUMENTS

| | | | | |
|---|---|---|---|---|
| CN | 108322549 | * | 7/2018 | ............ G06F 9/451 |
| CN | 114721606 | * | 7/2022 | ............... G06F 3/12 |
| JP | 2012153092 | * | 8/2012 | ............... G06F 3/12 |
| JP | 2014126877 | * | 7/2014 | ............... G06F 3/12 |
| JP | 2019219961 | * | 12/2019 | ............. B41J 29/38 |

* cited by examiner

*Primary Examiner* — Beniyam Menberu
(74) *Attorney, Agent, or Firm* — Millen, White, Zelano & Branigan P.C.; William F. Nixon

(57) ABSTRACT

Methods and systems for managing print jobs among a plurality of printing devices. At least one desktop client is disclosed in the methods and systems. The at least one desktop client includes a database storing a desktop client application and a processor configured to collect data, transmit/receive data with a cloud-based server, choose a suitable printing device and direct a print job to the suitable printing device. The at least one desktop client can be a computing device, a mobile device, or a local server. The at least one desktop device may also be a multiple-function printing device (MFP).

18 Claims, 8 Drawing Sheets

CLOUD-BASED PRINTING MANAGING SYSTEM AND METHOD

FIELD OF THE INVENTION

The present invention relates to managing print jobs among a plurality of printing devices, and more particularly, to a system and method for managing print jobs based on printing device profiles and printing device statuses to achieve fast and effective printing performance.

DESCRIPTION OF THE RELATED ART

Cloud-based printing platforms have been used in the art. The known cloud-base printing platforms, such as a HyPAS (powerful software solution platform) are capable of sending documents to be printed to various printing devices. In the existing system, when a registered user wants to print a document from a desktop application, the desktop client would first upload the document to the cloud server. The user then goes to any supported printer and selects the print job from the cloud server. The user may also select a document from a linked third-party cloud storage account (e.g., Google Driver, OneDrive, Box, etc.). At this point, the cloud server downloads the document associated with the print job to the printer for printing.

In such cloud-based printing systems, the documents need to be uploaded to the cloud in advance before the cloud-based printing systems can send them to assigned printing devices. The currently-know HyPAS has limited memory and cannot perform complex print option. Further, the printing of the physical documents is initiated from HyPAS side so that even a more updated desktop client with model specific printer driver installed cannot access the documents itself. Furthermore, the uploaded document would be in a PDF form or a format that the printers can support. However, due to a limited memory and processing power of a printer/MFP, the printer cannot support documents with formats other than PDF and some image formats (e.g., PNG, TIFF).

SUMMARY OF THE INVENTION

A method for distributing and controlling print jobs among a number of printing devices is disclosed. The method comprises registering at least one computing device as a desktop client of a cloud-based server. The desktop client is capable of communicating with the cloud-based server and at least one of the number of printing devices to collect data and provide commands. The method collects print driver capabilities from the number of printing devices, creates a printer profile for each of the number of the printing devices based on the collected print drive capabilities, and saves the printer profile of each of the number of printing devices at the cloud-based server. The method also searches the printer profiles saved in the cloud-based server to look for at least one printing device that is suitable to perform a print job in a print job queue when the print job queue exists, scans applications supported by the at least one desktop client, uploads documents that can be accessible and printable by the number of printing devices to the cloud-based server, and downloads a document corresponding the print job to a matched printing device for printing.

A system for distributing and controlling print jobs among a number of printing devices is further disclosed. The system comprises a cloud-based server that includes a storage for storing a number of documents that is accessible and printable by the number of printing devices. The number of printing devices includes at least one un-registered printing devices of the cloud-based server and at least one registered printing devices of the cloud-based server. The registered printing devices is installed with a desktop client application, and the desktop client application is configured to cause the registered printing device to collect data, manage and execute a print job in a print job queue. The at least one registered printing device comprises a processor in communication with the number of printing devices, and a memory coupled to and readable by the processor, the memory storing a set of program instructions which, when executed by the processor, configures the processor to collect printer driver capabilities of the at least one registered printing device, create a printer profile for each of the at least one registered printing device based on the collected printer driver capabilities, saves the printer profile of the at least one registered printing device to the cloud-based server, scans a print job queue, searches the printer profiles saved in the cloud-based server and applications supported by the at least one registered printing device that are suitable to perform a print job in the print job queue, and downloads a document saved in the storage corresponding the print job to a suitable printing device for printing.

A system for distributing and controlling print jobs among a number of printing devices further comprises at least one desktop client, wherein the at last one desktop client is a computing device or a mobile device that communicates with the cloud-based server and the at least one un-registered printing device to collect data and provides commands. The at least one desktop client comprises processor in communication with the number of printing devices, and a memory coupled to and readable by the processor, the memory storing a set of program instructions which, when executed by the processor, configures the processor to collect printer driver capabilities of the at least one un-registered printing device, create a printer profile for each of the at least one un-registered printing device based on the collected printer driver capabilities, save the printer profile of the at least one un-registered printing device to the cloud-based server, scan the print job queue, search the printer profiles saved in the cloud-based server and applications supported by the at least one un-registered printing device that are suitable to perform the print job in the print job queue, and download a document saved in the storage corresponding the print job to a suitable un-registered printing device for printing.

A desktop client communicating with a cloud-based server and a number of printing devices for managing print jobs between the number of printing devices is also disclosed. The desktop client comprises a processor in communication with the number of printing devices, and a memory coupled to and readable by the processor, the memory storing a set of program instructions which, when executed by the processor, configures the processor to collect printer driver capabilities of the number of printing devices, create a printer profile for each of the number of printing devices based on the collected printer driver capabilities, save the printer profile of each of the number of printing devices to the cloud-based server, scan a print job queue, search the printer profiles saved in the cloud-based server and applications supported by the number of printing device that are suitable to perform a print job in the print job queue, and send a document corresponding the print job to a suitable printing device for printing.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
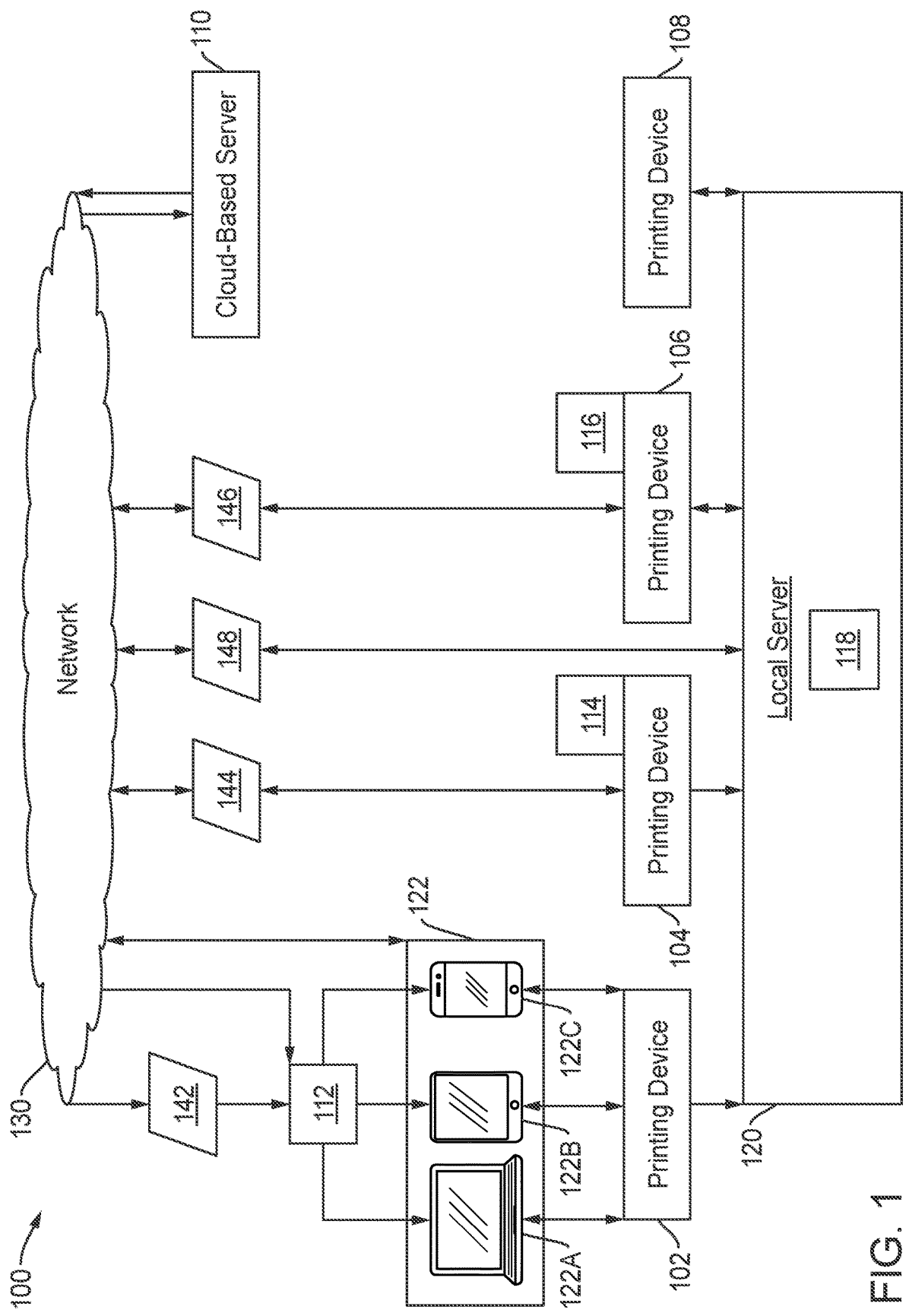
FIG. 1 illustrates a cloud-based system for managing print jobs among a plurality of printing devices according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments of a cloud-based printing job managing system provide more flexibilities on accessing and assigning documents related to print jobs in a printing queue. A plurality of printing devices and/or a MFP (multiple-function printer) upload documents to be printed to a cloud-based server. The server, by communicating with at least one desktop client, assigns and directs a print job in a print job queue to a printing device capable of executing the print job and downloads a document associated with the print job to the printing device. In the preferred embodiments, the at least one desktop client can also upload the documents to the cloud-based server, choose a printing device that supports a document format of a document associated with a print job, and directs the cloud-based server to download the document to the printing device. Alternatively, the at least one desktop client may download the document from the cloud-based sever and then send the document to a printing device which is capable of executing the printing of the document.

In the disclosed embodiments, the desktop client scans printer driver queues of each of the plurality of printing devices, collects driver capabilities, such as printcaps, public and private DEVMODE, and sends the collected driver information to the cloud-based server. Based on this information, the cloud-based server creates a printer profile for each of the plurality of printing devices. The desktop client may also collect printing features and printer statuses of each of the plurality of printing devices, such as paper sizes, print colors, supported printed formats, etc. and send them to the cloud-based sever to be saved in the printer profiles. The collected printer features may also be saved in a server database. The desktop client may be a managing computing device which communicates with the plurality of printing devices and the cloud-based server through a desktop client application to manage directing print jobs between the plurality of printing devices. The desktop client may also be an application that is installed in the plurality of printing devices or a mobile device or a local server. The mobile device may be used to communicate with the cloud-based server or the local server and a printing device to enable downloading a document to the printing device for printing. The local server may control and manage printing jobs of a plurality of printing devices within a same domain of the local server or different domains of different servers.

FIG. 1 is a schematic diagram showing a cloud printing managing system 100 for managing print jobs among a plurality of printing devices, and/or MFP (multiple-function printing system) in accordance with the disclosed embodiment. Managing system 100 includes cloud-based server 110, a plurality of printing devices 102-108, and at least one desktop client 122, 120 for managing print jobs among the plurality of printing devices and cloud-based sever 110. Printing devices 102 and 104 may be similar device models, while printing devices 106 and 108 also may be similar device models that differ from printing devices 102 and 104. Or, printing device 106 may be a different model altogether. Additional printing devices may be associated with the different models. Further, system 100 may include additional models of printing devices not shown here for brevity.

A given printing device may be configured to perform one or more functions such as printing, scanning, emailing, storing, modifying, receiving, or transmitting one or more documents or files. In some embodiments, each printing device may include hardware and software components associated with a firmware package. Firmware may refer to packages of software installed on embedded devices. Each firmware may include a version for the different packages for the components within the printing device.

Each printing device 102, 104, 106, and 108 may be configured to perform one or more steps, actions, or functions disclosed herein. For example, printing device 108 may communicate with a managing server 120 to transmit or receive data, or information, 148, including error codes, print counter values, time stamps, error intervals, mean time between failures (MTBF), error frequency codes, time intervals, numbers of printed pages, numbers of errors, print volume, remaining numbers or percentage of papers in paper cassettes, paper sizes in paper cassettes, toner levels, and other related information. Each printing device may send and receive its own data packages, as shown in FIG. 1, to managing sever 120 or cloud-based server 110 via network 130. Data may be routed within system 100 using a protocol, such TCP/IP, in that each device includes its own unique network address. Thus, printing device 102 may transmit or receive data 142, printing device 104 may transmit or receive data 144, printing device 106 may transmit or receive data 146, and so on. Details of a printing device with a desktop application will be described in FIG. 3.

In accordance with the disclosed embodiments, the plurality of printing devices 102-108 are preferably subscribed printing devices of system 100 and are each installed with a desktop client application so that they can manage print jobs directly with cloud-based server 110. For example, in the disclosed embodiments, printing devices 104, 106 are each installed with desktop client application 114, 116. If some of the plurality of printing devices, such as printing devices 102, 108, are not subscribed printing devices, these printing devices may still upload and receive documents associated with a print job from cloud-based sever 110 by means of at least one desktop clients 122 and 120. In this case, desktop client 122 or 120 may be a computing device, a tablet, a mobile device, or a managing server installed with the desktop client application. For example, desktop client 122 may include computer 122A, tablet 122B, and mobile phone 122C, each of which includes a database (not shown in FIG. 1) storing desktop client application 112 and a processor (not shown in FIG. 1) configured to execute desktop client application 112. Desktop client 120 is a local managing server installed with desktop client application 118 that communicates with cloud-based server 110 and printing device 108 for directing a print job to printing device 108. In the following descriptions, to avoid confusion, the desktop client means a computing device, a mobile device, a local server or any wireless communication device, which is installed with the desktop client application according to the disclosed embodiments. Therefore, printing devices that are installed with the desktop client application may also be referred as desktop clients.

Desktop clients may include a MFP, a mobile phone, a tablet or a local server located in a private domain or a local domain. When the desktop client is a mobile phone or a tablet, a user can use the mobile phone or tablet to select a printing device and to download a document from cloud-based server 110 to be sent to the printing device for printing. When the desktop client is a managing server, the server is able to manage at least one print job in a print queue among a number of printing devices. In the exemplary embodiment of FIG. 1, it shows only one printing device connected with desktop clients 122, 120, but it is clear that desktop clients 122, 120 may communicate and manage more than one printing device.

Desktop clients 122, 120 may upload documents to cloud-based server 110, download documents to be printed from the cloud-based server 110, and send the downloaded documents to the printing devices that support the printing features of the downloaded documents. The server may also store policies and statuses of each of the number of printing devices so that the server can send the downloaded documents to appropriate printing devices based on their policies.

Each desktop clients 122, 120 and printing devices 104, 106 includes at least one database for storing a desktop client application and a processor for executing the desktop client application. When the desktop client application is installed in desktop clients 122, 120 or printing devices 104, 106, the desktop client application first scans the plurality of printing devices 102-108 for printer driver queues of individual printing device. For example, in the embodiment of FIG. 1, desktop clients 122 and 120 scan printing devices 102, 108, respectively, via desktop client applications 112, 118, desktop client application 114 scans printing device 104, and desktop client application 116 scans printing device 106. At this time, desktop client applications 112, 114, 116, and 118 collect printer driver capabilities of each of the plurality of printing device 102-108, such as printcaps, public and private DEVMODE. The collected information is then sent to cloud-based server 110 and a profile of each of the plurality of printing devices are crated and stored in cloud-based server 110. Desktop clients 122, 120 and desktop client applications 114, 116 of printing devices 104, and 106 may also collect printing features and statuses of each of printing devices 102-108, such as paper sizes, ink colors, paper types, documents formats, etc., and send them to cloud-based server 110. The printing features and statuses of individual printing devices are added into their respective profiles at cloud-based server or are stored in their respective printer feature/status profiles.

Figure 2:
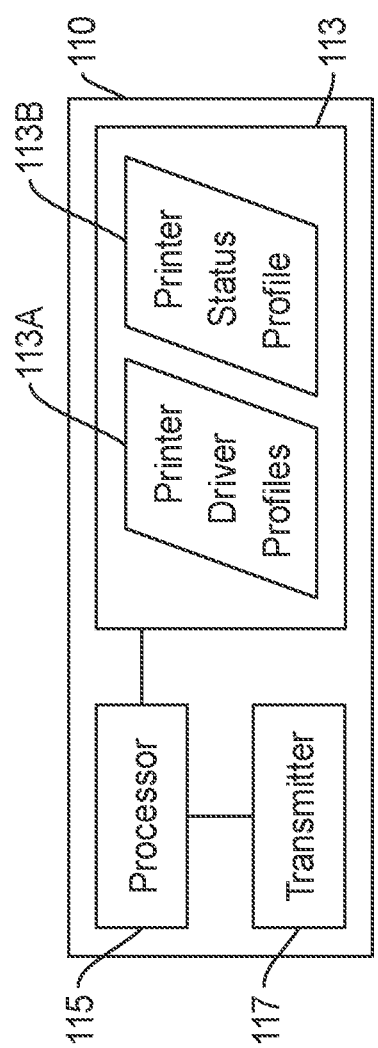
FIG. 2 depicts a block diagram of a cloud-based server according to the disclosed embodiments.

FIG. 2 is an illustrative block diagram of cloud-based server 110 showing that cloud-based server 110 includes a database 113 storing printer driver profiles 113a of each of the printing devices 102, 104, 106, and 108 and their printer features/status profiles 113b, processor 115 accessible to profiles 113a and 113b and transceiver 117 for transmitting and receiving data, a print job queue having at least one print job, documents associated with the at lest one print job, etc. from at least one desktop client.

Alternatively, the printer feature/status profiles may be created and stored at a database of a local managing server, which can be server 120 or a different server (not shown), and are not sent and stored in cloud-based sever 110. In this embodiment, server 120 may direct a document associated with a print job to a printing device that is capable of performing the printing of the document based on the printing features and printer statuses of the printing device.

Further, according to the disclosed embodiments, when a new printer driver is added or a print queue is created or deleted, or an existed printer driver is deleted, the printer profiles 113a and status profiles 113b would be updated on cloud-based server accordingly.

Once the printer profiles are created and saved, and a print job queue exists, desktop clients 122, 120 and desktop client applications 114 and 116 scan printing devices 102, 108, 104, and 106 for applications supported by the desktop clients 122, 120 and printing devices 104, 106. The desktop clients and desktop client applications would look for specific applications that support different document formats, e.g., MS Office apps for various MS Office formats like xls, ppt, doc, etc. One exemplary criterion is that the applications should support command line printing, e.g., no need for manual operation/user intervention for printing. Information regarding the applications supported by the desktop clients and the printing devices may be saved in a database associated with a local server, such as sever 120, or be transmitted to cloud-based sever 110 and saved in printer driver profile 113a.

In some cases, there may be some document formats not normally recognized by the cloud printing managing system, such as *.asta. In this case, the user may register an application for a document format not normally recognized by cloud-based managing system 100.

A print job queue may include at least one print job. In accordance with the disclosed embodiments, when the print job queue exists, the print job queue including the at least one print job would be sent to cloud-based server 110, so are documents associated with the at least one print job. Cloud-based server 110 may perform one or more tasks to manage or maintain printing devices within system 100. Cloud-based server 110 may communicate with desktop clients 122 and 120 and printing devices 104, 106 (also referred as desktop clients since they are installed with the desktop application,) and to transmit and receive data to/from the desktop clients. In some embodiments, cloud-based server 110 may transmit a command to one or more of the printing devices to reset, install updates, or perform one or more printing or maintenance functions or operations. In other embodiments, cloud-based server 110 may receive data from one or more printing devices, shown as data 142, 144, 146, and 148, such as error codes, print counter values, time stamps, error intervals, mean time between failures (MTBF), error frequency codes, time intervals, numbers of printed pages, remaining papers and paper sizes stored in paper cassettes, numbers of errors, print volume, and other related information. Those data will be stored in the printer status database 113b.

Cloud-based server 110 may include one or more computing devices or systems. It also may be consolidated into a single physical location or distributed across two or more physical locations. Cloud-based server 110 may include hardware, software, or firmware configured to perform one or more functions disclosed below. Cloud-based server 110 is disclosed in greater detail by FIG. 4.

Network 130 in system 100 may include one or more wired or wireless connections that support communication between the devices of system 100. In some embodiments, network 130 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 130 is configured to allow communication between cloud-based server 110 and one or more printing devices within system 100, between the printing devices themselves, or between one or more other devices or systems and system 100. Such communications may include commands, requests, or data corresponding to documents, printing-device errors, or other data.

Figure 3:
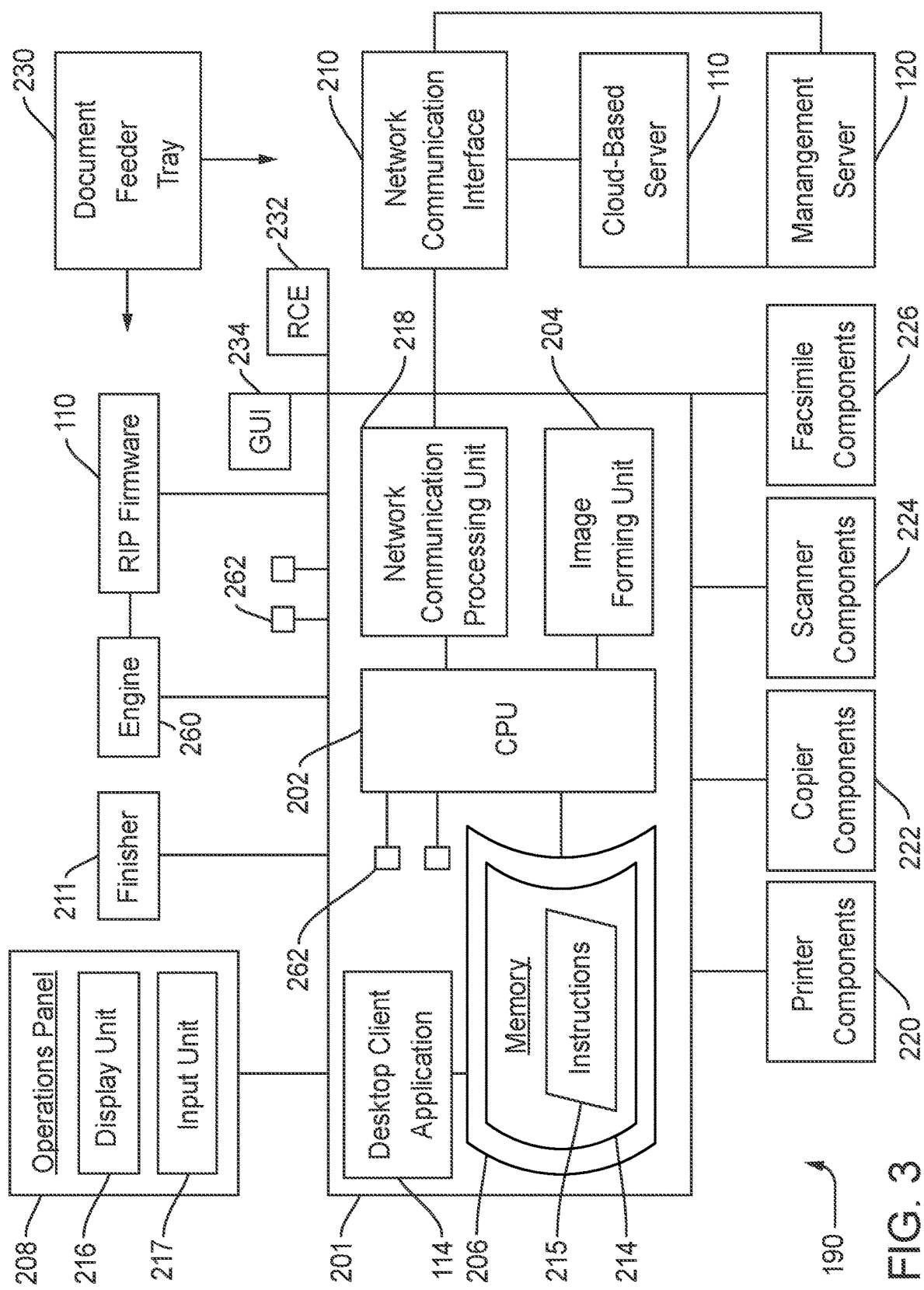
FIG. 3 depicts a block diagram of components of a desktop client printing device according to the disclosed embodiments.

FIG. 3 depicts a block diagram of components of a printing device according to the disclosed embodiments. In the disclosure of FIG. 3, printing device 104 may be referred to for illustrative purposes. The architecture shown in FIG. 2 may apply to any multi-functional printing device or image forming apparatus that performs various functions, such as printing, scanning, storing, copying, and the like within printing system 100. As disclosed above, printing device 104 is installed with the desktop client application and may send and receive data from cloud-based server 110 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 114, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a cassette. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder cassette 230 may be the physical components of printing device 104 to receive papers and documents to be processed. A document is placed on or in document processor input feeder cassette 230, which moves the document to other components within printing device 104. The movement of the document from document processor input feeder cassette 230 may be controlled by the instructions input by the user. For example, the document may move to a scanner flatbed for scanning operations. Thus, document processor input feeder cassette 230 provides the document to scanner components 220. As shown in FIG. 3, document processor input feeder cassette 230 may interact with engine firmware 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

For example, desktop client application 114 is stored in memory unit 206 which when executed, causes CPU 202 to scan printing device 104 for information like printer driver capacities, printing features and printer status. Desktop client application 114, when executed, may also cause network communication unit 218 to transmit/receive data and documents associated with print jobs in a print job queue from cloud-based sever 110 or a local managing sever 120, such as sever 120 of FIG. 1.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using a network, such as a wireless or wired connection with one or more other image forming apparatuses or cloud-based server 110. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

In some embodiments, cloud-based server 110 may send updates to firmware on printing device 104. Thus, engine 260 or RIP firmware 290 may be updated by a firmware, for example, firmware 312 shown in FIG. 4, which is a more recent version of the firmware installed on printing device 104. The installation of the new firmware version, however, may result in additional errors or degradation of performance of printing device 104. In this instance, printing device 104 may not install firmware 312.

To this end, printing device 104 may include one or more sensors 262 (only four are shown in the figure for brevity) that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, number of papers remained in the paper cassettes, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code. Computing platform 201 may transmit the error alert along with the error code to cloud-based server 110. Further, sensors 262 may detect the paper size, a percentage of paper remained, a toner level and so on, and send the detection results to computing platform 201. Computing platform 201 in turns sends the results to server 120 or cloud-based server 110 upon request or automatically.

Display unit 216 may display information about applicable error codes and a short description of the error associated with the operational issue or failure event. Further, display unit 216 may display an instruction on how to proceed (operate) to resolve the error. For example, if a network error occurred, then the following message may be provided on operations panel 208: Reboot the device.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. The history of failure events may be sent via network communication interface 210 to local server 120 or cloud-based sever 110 for statistical purpose. Printing device 104 communicates with cloud-based server 110 via network communication interface 210 by utilizing a network protocol. In some embodiments, printing device 104 communicates with local sever 120 or cloud-based sever 110 through REST API, which allows the server to collect data from multiple devices via network 130 (shown in FIG. 1). REST API and SOAP are application protocols used to submit data in different formats, such as files, XML messages, JSON messages, and the like. By utilizing applicable network communication protocols and application protocols, printing device 104 submits the applicable error code or codes to local server 120 or cloud-based server 110. Local server 120 or cloud-based server 110 collects error codes and data from individual devices, stores information in the database for further analysis, and creates information data entries for individual printing devices. The data stored in the database includes device identification, timestamp, error code, remaining number or percentage of papers, paper size, and the like.

According to preferred embodiments of the present invention, after analyzing the collected information from individual printing devices, cloud-based server 110 or desktop clients (i.e., computing devices installed with desktop client application, such as devices 122, 120, 104, and 106 in the embodiment shown in FIG. 1) distributes different printing jobs received from a network to different printing devices based on the collected information, and re-directs printing jobs to a different printing device when detecting an error or warning from an assigned printing device. The details of managing server 120 and cloud-based server 110 will be described in detail below with reference to FIGS. 4-5.

Figure 4:
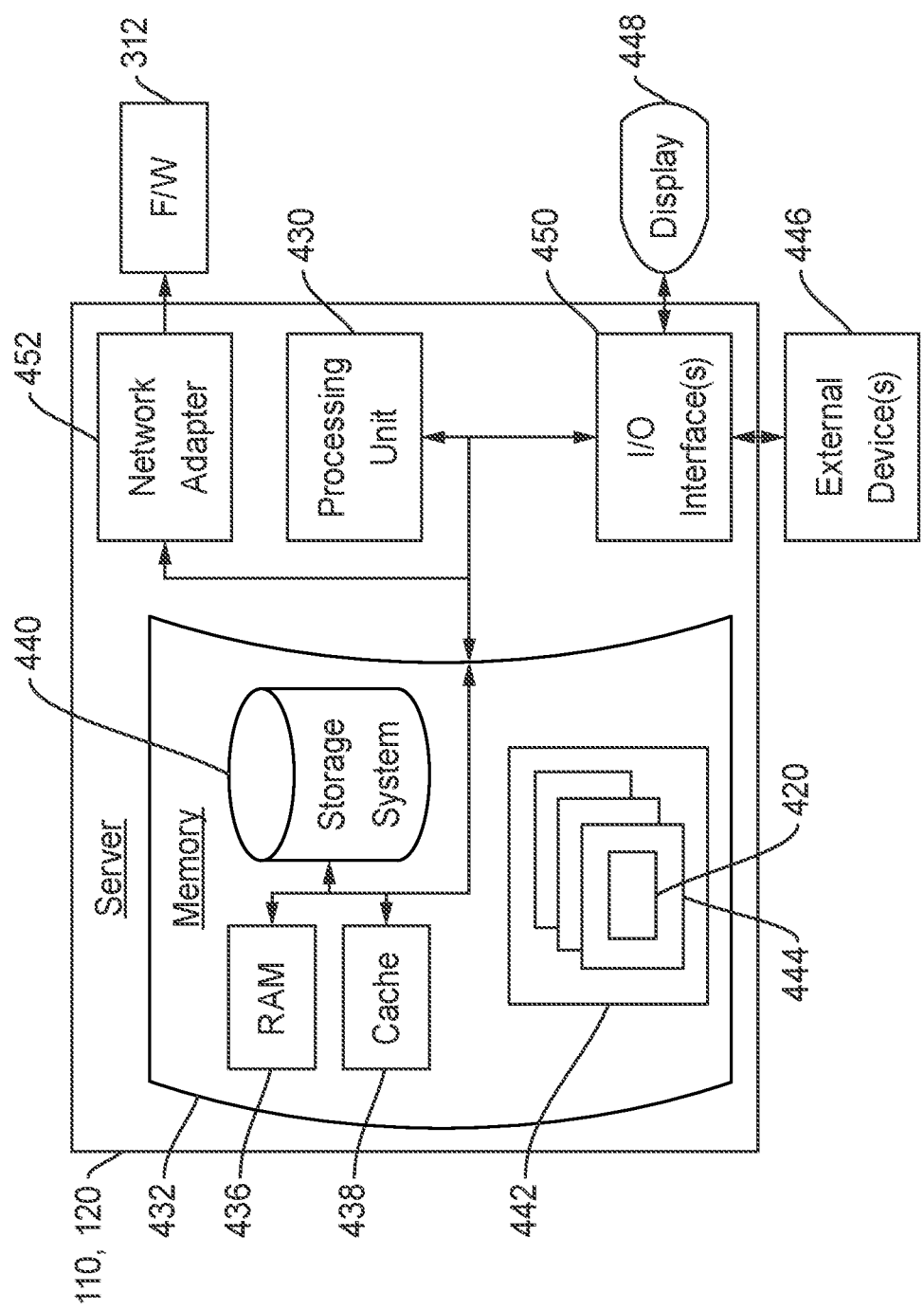
FIG. 4 depicts a block diagram of a managing server or a cloud-based sever according to the disclosed embodiments.

FIG. 4 depicts a block diagram of managing sever 120 or cloud-based server 110 according to the disclosed embodiments. The components of managing server 120 or cloud-based server 110 may include, but are not limited to, one or more processors or processing units 430 and a server memory 432. A server bus 434 couples various server components including server memory 432 to processor 430. Managing server 120 or cloud-based server 110 may include a variety of computer readable media. Such media may be selected from any available media that is accessible by managing server 120 or cloud-based server 110, including non-transitory, volatile, and non-volatile media, removable and non-removable media. Server memory 432 could include one or more personal computing readable media in the form of volatile memory, such as random access memory (RAM) 436 or a cache memory 438. In some embodiments, a storage system 440 may be provided for reading from and writing to a non-removable, non-volatile magnetic media device, such as a hard drive.

Server memory 432 may include at least one program product or utility 442 having a set, or at least one, of program modules 444 that may be configured to perform the functions of the disclosed embodiments. Program modules 444 may include, but are not limited to, an operating system, one or more application programs, other program modules, and program data. Each of the operating systems, one or more application programs, other program modules, and program data or some combination thereof, may include an implementation of a networking environment. Program modules 444 may perform the functions or methodologies of embodiments of the invention as disclosed herein. For example, a program module 444 in cloud-based server 110 may be configured to determine if components of one of the printing devices of system 100 needs to be replaced or fixed due to a failure event, error, or warning within the device.

Cloud-based server 110 may communicate with one or more external devices 446, such as a keyboard, a pointing device, a stylus, a display 448, or any similar devices, such as a network card, modem, and the like. Display 448 may be a light emitting diode (LED) display, a liquid crystal display (LCD) display, a cathode ray tube (CRT) display, and the like. External devices 446 may enable cloud-based server 110 to communicate with a printing device. Such communication may occur via input/output (I/O) interfaces 450. Alternatively, cloud-based server 110 may communicate with one or more networks such as a local area network (LAN), a general wide area network (WAN), or a public network via a network adapter 452. Cloud-based server 110 may be coupled to a network via a wired or wireless connection. Network adapter 452 may communicate with the other components via bus 434.

Any combination of one or more computer readable media, for example, storage system 440, may be utilized. In the context of the disclosed embodiments, a computer readable storage medium may be any tangible or non-transitory medium that contains, or stores, a program, such as program product 442, for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

In some embodiments, cloud-based server 110 or managing server 120 may release firmware 312, which is an upgrade to existing firmware on one or more printing devices within system 300. Firmware 312 may be forwarded to one or more printing devices through network adapter 452 when instructed by processing unit 430. Processing unit 430 may execute instructions stored in server memory 432 to configure cloud-based server 110 or managing server 120 to perform the steps and functions disclosed below. Specifically, instructions stored in program modules 444 may determine whether to upgrade firmware within the plurality of devices in system 100.

Figure 5:
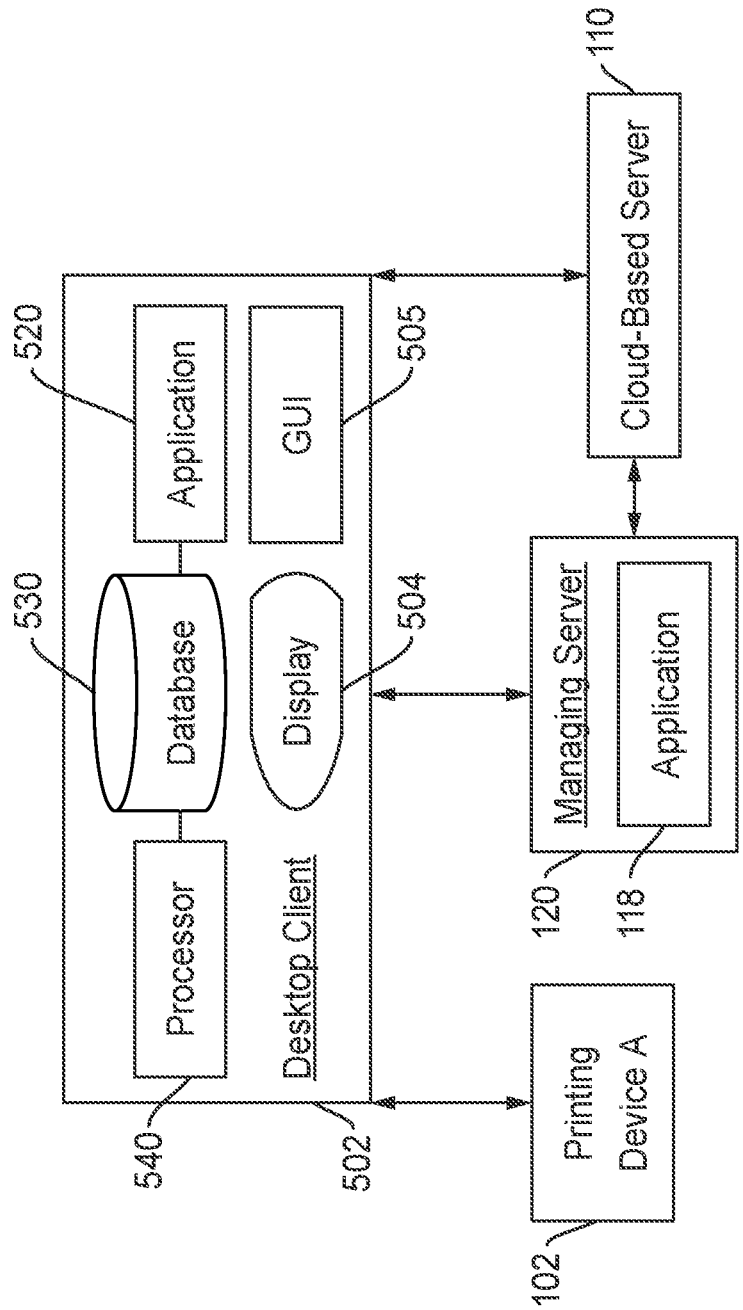
FIG. 5 depicts a block diagram of a cloud-based printing managing system using a desktop client to manage print jobs according to the disclosed embodiments.

FIG. 5 depicts a block diagram of cloud-based printing managing system 100 using a desktop client to manage print jobs according to the disclosed embodiments. As described above, a desktop client may be a computing device, such as computer 122a, tablet 122b, and mobile phone 122c of FIG. 1. Desktop client may also be a local managing server, such as sever 120 of FIG. 1. Desktop client further could be a printing device or MFP, such as printing devices 104 and 106 of FIG. 1. The desktop client includes a database storing the desktop client application and a processor performing a number of functions when the desktop client is executed. FIG. 3 depicts a block diagram of a printing device installed with a desktop client application and functioning as a desktop client. In the embodiment of FIG. 5, the desktop client is a mobile device, as an example.

FIG. 5 includes mobile device 502 served as a desktop client, which may be included in system 100. Mobile device 502 may communicate with managing server 120, cloud-based server 110, and printing device 102. According to the disclosed embodiments, FIG. 5 only show one printing device, but it would be understandable that mobile device 502 may also communicate with more than one printing devices. Mobile device 502 includes display 504. Display 504 may be a screen that receives input from the user of mobile device 502. For example, a graphical user interface (GUI) 505 may be implemented using display 504 to interact with the user. Mobile device 502 also may include desktop client application 520 used for managing print jobs of printing device 102.

Mobile device 502 includes a database for storing a desktop client application 520 and a processor configured to, when desktop client application 520 is executed, communicate with cloud-based sever 110, managing server 120, and printing device 102, collect data from printing device 102, and managing print jobs in a print job queue.

In the disclosed embodiment of FIG. 3, when a printing device is a subscribed desktop client, to begin print jobs operations, the user can go the subscribed desktop client to print a document associated with a print job in a print job queue. Alternatively, instead of printing, the user can just upload the document to cloud-based sever in its original format. Normally, when a print job queue exists in cloud-based server 110, cloud-based server 110 would search the printer driver profiles 113a and the printing feature/status profiles 113b to look for a list of printing devices that supports document formats of documents associated with print jobs in a print job queue. Cloud-based server 110 then sends a first document associated with a first print job in the print job queue to a first printing device that supports the document format of the first document. Cloud-based server 110 next sends a second document associated with a second print job in the print job queue to a second printing device that supports the document format of the second document, and so on. The user may also go to any supportive printing device (i.e., desktop client) and select a supported print job from cloud-based server 110 for printing. Alternatively, the user can select a document from a linked third party cloud storage account, e.g., Google Drive, OneDrive, Box. It is noted that, due to the limited memory/processing power of the printing device, some document types other than PDF and some image formats (PNG, TIFF) may not be supportive.

Before printing the documents, the user may select some print options, such as paper size, orientation, color or mono, and so on.

In the disclosed embodiment of FIG. 5, printing device 102 is not a subscribed printing device, i.e., non-desktop client of system 100. In this case, mobile device 502 or a HyPAS (not shown) that is installed with desktop client application 520 is used to manage printing documents at printing device 102. HyPAS or mobile device 502 may be deemed as a part of multi-vendor support for unsubscribed printing devices.

To begin printing operations, mobile device 502 or HyPAS (not shown here) may perform the following operations: (1) checks for a model a print job in the print job queue is printing to; (2) check with the cloud-based server 110 for a list of printer driver profiles that match the model; (3) check the document formats supported by the printing devices with matching printer driver profiles; and (4) after checking the supported document formats and printer driver profiles, a list of basic and advanced print options will be presented to the user.

After selecting the print options, the print job is downloaded to mobile device 502 with the matching a) application to print the specific document format, and b) printer driver to support advanced printing options. If mobile device 502 intends to print the document with the advanced print options, mobile device 502 can directly send the print job to a target printer if the target printer is within a same network of mobile device 502. If the target printer is not within a same network of mobile device 502, then the mobile device will download the print job from cloud-based server 110 and send it to the target printing device.

It is noted that a local managing sever, such as server 120, may also serve as a desktop client to upload documents received from a plurality of printing devices, search for matching printer driver profiles saved in cloud-based server 110, and download print jobs and documents associated with the print jobs to the target printing device.

Figure 6:
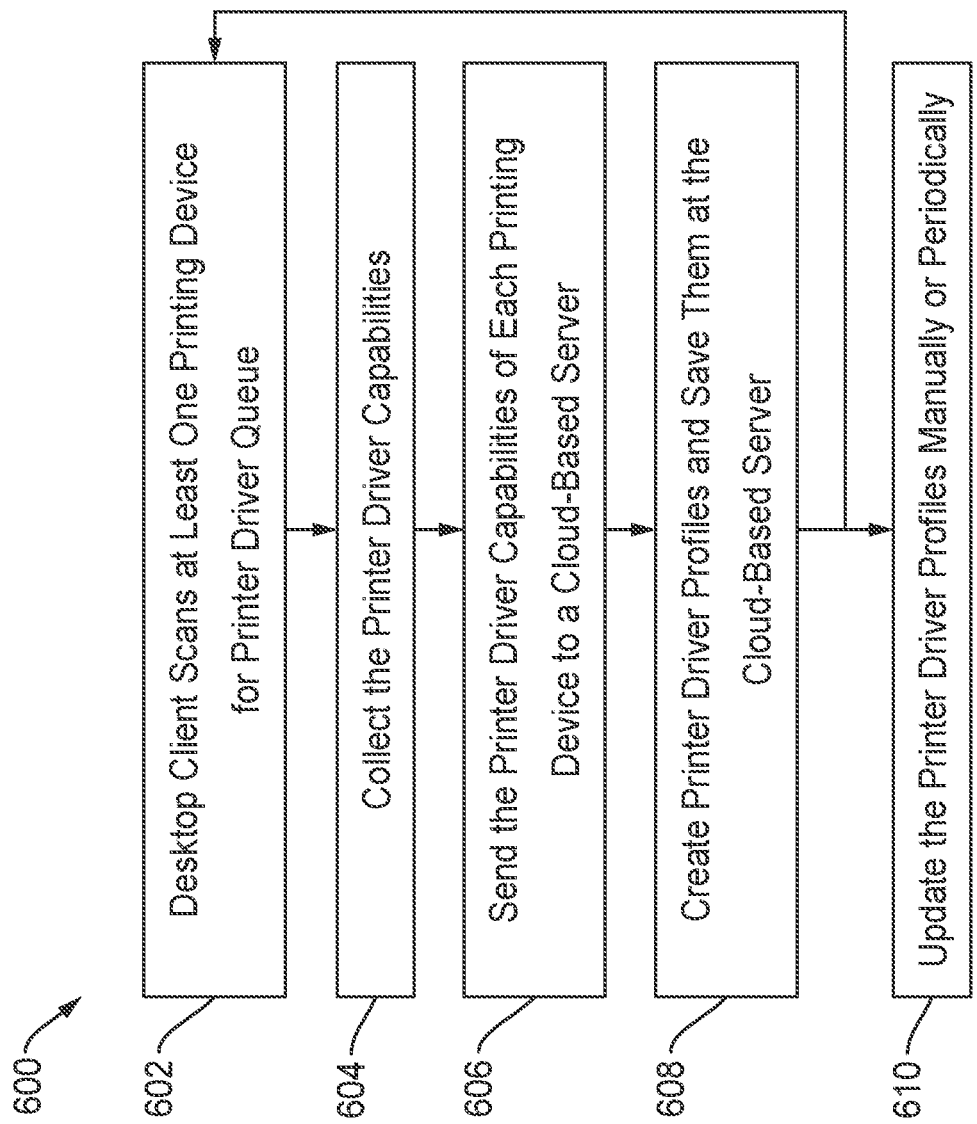
FIG. 6 depicts a flowchart for performing pre-printing operations using desktop clients in accordance with the disclosed embodiments.

FIG. 6 depicts a flowchart 600 for performing pre-printing operations using desktop clients in accordance with the disclosed embodiments. Flowchart 6 may refer to FIGS. 1-5 for illustrative only. Flowchart 600, however, is not limited by the embodiments disclosed in FIGS. 1-5.

At step 602, when a desktop client application is installed in a printing device or a desktop client already exists before printing operations begin, the desktop client scans the printing device for its printer driver queue.

Step 604 executes by desktop client collects printer driver capabilities, such as printcaps, public and private DEVMODE.

Step 606 executes by sending the collected printer driver capabilities to cloud-based server 110 and step 608 executes by creating a printer driver profile for the printing device, and saving the printer driver profile at cloud-based server 110.

Steps 602-608 may be repeated for different desktop client (i.e., different printing device installed with the desktop client application. All of the created printer driver profiles for a number of printing devices are saved at cloud-based sever 110.

Next, step 610 executes by updating the printer driver profiles stored at cloud-based server 110. The printer driver profiles may be updated based on a deletion of a desktop client, an addition of a desktop client, or a change of printer driver capabilities. In one embodiment, cloud-based server 110 may periodically requests the desktop client to send printer driver capabilities updates to cloud-based server 110, or the desktop client sends updates of printer driver capabilities to cloud-based server 110 periodically or manually if a new desktop client is subscribed to system 100 or an existing desktop client unsubscribed to system 100.

Figure 7:
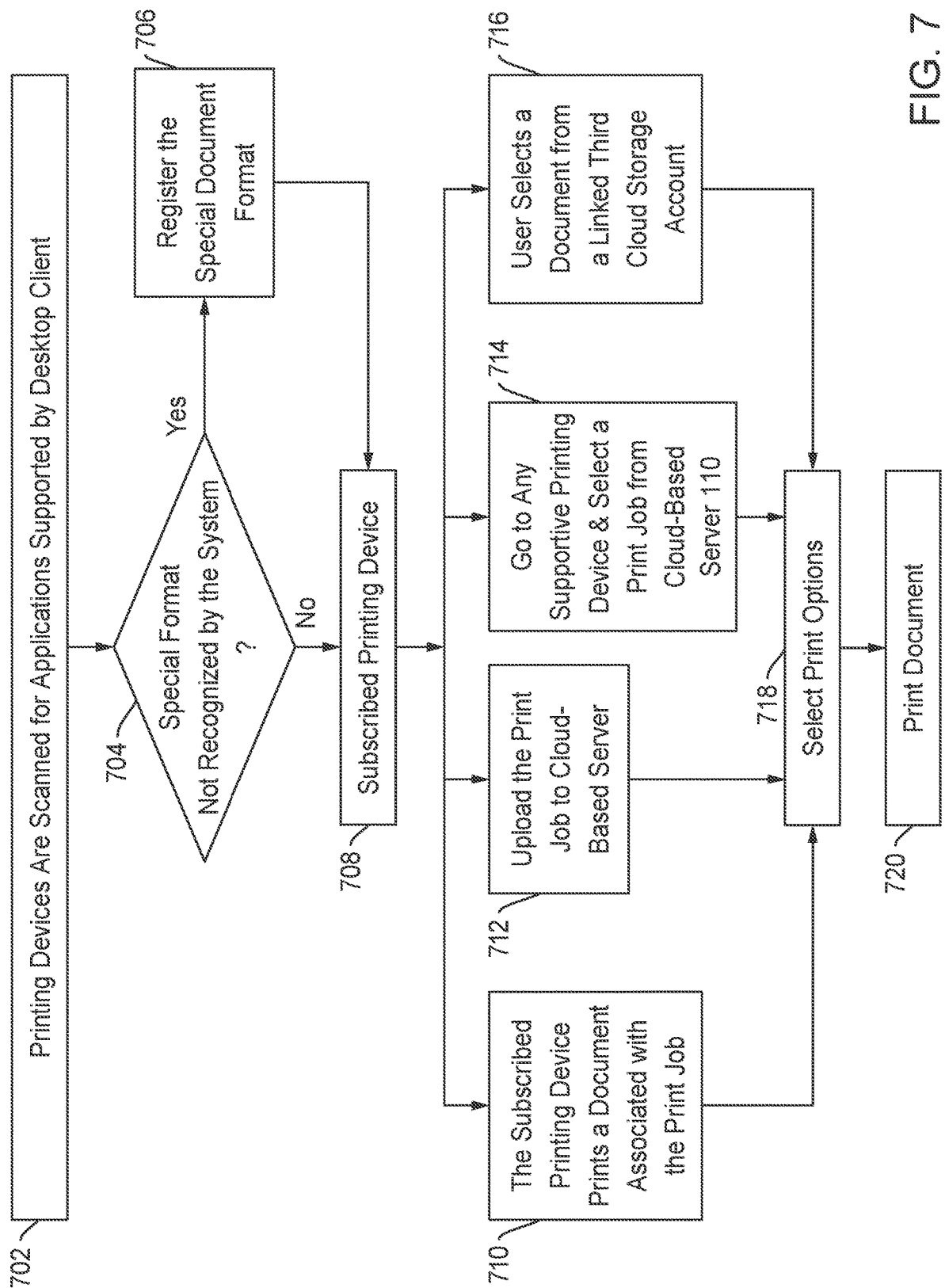
FIG. 7 depicts a flowchart for performing printing operations with desktop client in accordance with the disclosed embodiments.

FIG. 7 depicts a flowchart 700 for performing printing operations with desktop client in accordance with the disclosed embodiments. Flowchart 700 may refer to FIGS. 1-6 for illustrative purposes. Flowchart 700, however, is not limited by the embodiments disclosed in FIGS. 1-6.

Step 702 executes by desktop clients scanning printing devices for applications supported by the desktop client when a print job exists. The desktop client would be looking for specific applications that support different document formats, e.g., MS Office apps for various MS Office formats like xls, ppt, doc, etc. One criterion is that the applications should support command line printing; that is, no user's manual operation and user intervention are needed when performing the printing.

Step 704 executes by checking if there is a special document format not normally recognized by system 100. If there is, step 706 executes by registering the special document format to system 100. Once the document formats are checked, the user can print a document associated with the print job in different ways.

First, if the desktop client is a subscribed printing device installed with the desktop client application, at step 708, the user can print the document associated with the print job at the subscribed printing device, as executed at step 710. The desktop client may also upload the print job (output to PDF or whatever document/PDL format that the printing device supports) to cloud-based server 110, as shown at step 712.

Alternatively, at step 714, the user can go to any supported printing device and select the print job from cloud-based server 110. Or at step 716, the user may select a document from a linked $3^{rd}$ party cloud storage account.

At this point, step 718 executes by selecting print options, such as selecting the paper size, printing in color or monocolor, orientation, and so on. After that, step 720 executes by printing the document.

In some embodiments, a printing device may not be a subscribed printing device. In this case, a desktop client installed with a desktop client application can be used to control and manage the print jobs of the unsubscribed printing device.

Figure 8:
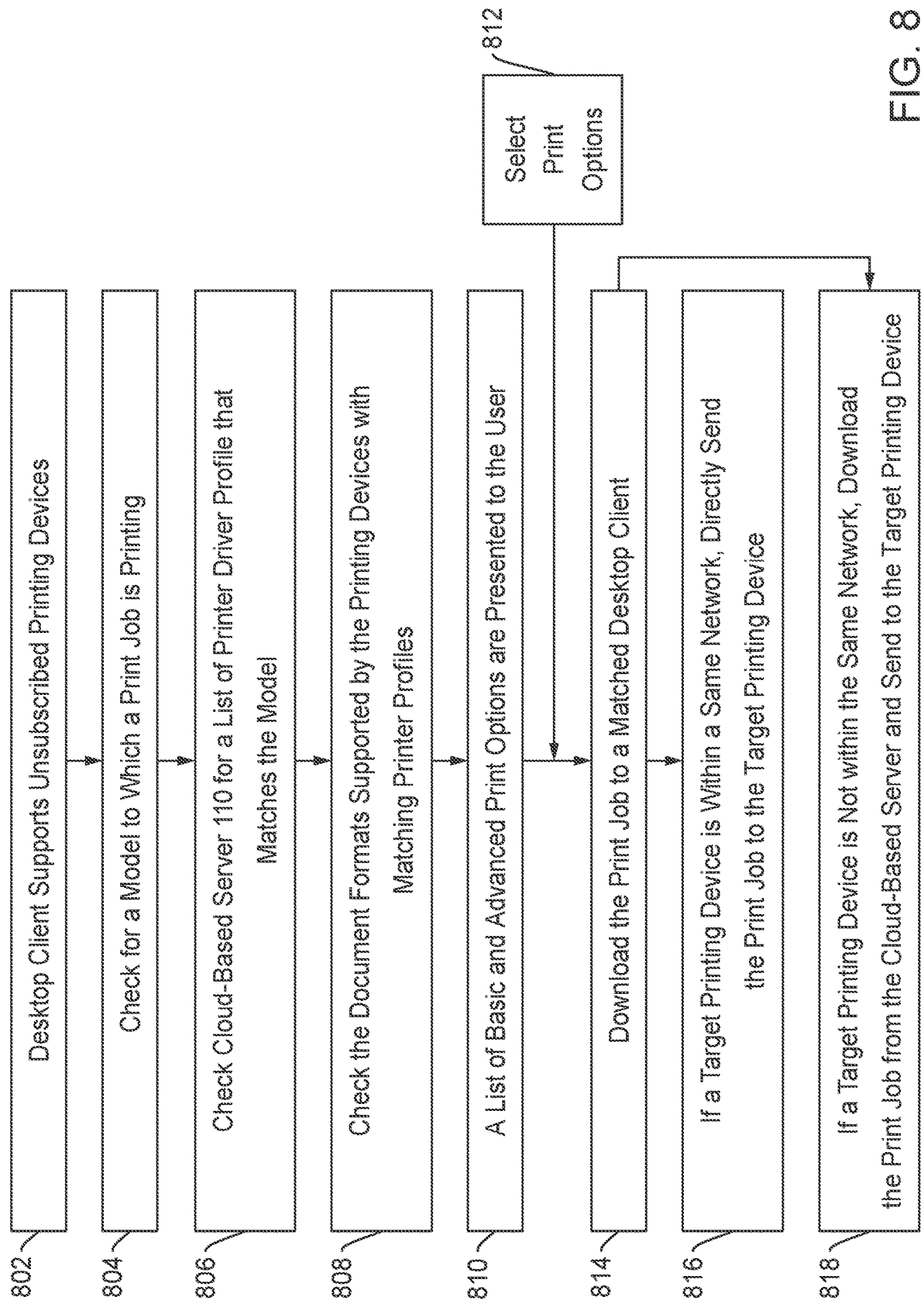
FIG. 8 depicts another flowchart for performing print job operations when a desktop client is a mobile device, a HyPAS, or a managing server that supports a number of unsubscribed printing devices.

FIG. 8 depicts flowchart 800 for performing print job operations when using a desktop client to manage print jobs of an unsubscribed printing device. Flowchart 800 may refer to FIGS. 1-7 for illustrative purposes. Flowchart 800, however, is not limited by the embodiments disclosed in FIGS. 1-7.

Step 802 executes by using a desktop client to perform print job operations of at least one printing device. According the disclosed embodiments, the desktop client may be a mobile device, a HyPAS, or a managing server that supports a number of unsubscribed printing devices.

Step 804 executes by checking for a model the print job is printing to.

Step 806 executes by checking cloud-based server 110 for a list of printer driver profiles that match the model being printed to.

Step 808 executes by checking the document formats supported by the number of printing devices with matching printer driver profiles. Next, at step 810, a list of basic and advanced print options are presented to the user.

Step 812 executes by selecting print options. This step is similar to step 718.

After selecting the print options, step 814 executes by downloading the print job to a desktop client with the matching application to print the specific document format and matching printer driver to support the advanced printing options. If a target printing device that is able to perform the print job is within a same network, the desktop client will send the print job directly to the target printing device and the target printing device will print the document with the advanced print options, at step 816.

However, at step 818, if the target printing device is not within the same network of the desktop client, the desktop client (i.e., the mobile device, or HyPAS, or the managing server) will download the print job from cloud-based server 110 and send the print job to the target printer for execution.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for distributing and controlling print jobs among a number of printing devices, the method comprising:
    registering at least one computing device as at least one desktop client of a cloud-based server, wherein the at least one desktop client is installed with a desktop client application after registration and communicates with the cloud-based server and at least one of the number of printing device to collect data and provide commands;
    collecting print driver capabilities from the number of printing devices;
    creating a printer profile for each of the number of the printing devices based on the collected print drive capabilities;
    saving the printer profile of each of the number of printing devices at the cloud-based server;
    searching the printer profiles saved in the cloud-based server to look for at least one printing device that is suitable to perform a print job in a print job queue when the print job queue exists;
    scanning applications supported by the at least one desktop client;
    uploading documents that can be accessible and printable by the number of printing devices to the cloud-based server; and
    downloading a document corresponding to the print job to a suitable printing device for printing,
    wherein the desktop client application is installed to a memory of the at least one computing device as the at least one desktop client, wherein the desktop client application is configured to, when executed by a processor of the at least one desktop client, collect information regarding the printer driver capabilities from the number of printing devices and send the collected information to the cloud-based server.

2. The method of claim 1, wherein the applications supported by the at least one desktop client supports different document formats.

3. The method of claim 1, further comprising collecting printing features and printer statuses of the number of printing devices, and wherein the printing features include paper sizes, document formats, printing colors, and paper counts that the number of printing devices are capable of execution.

4. The method of claim 1, wherein the collected printing features and the printer statuses are saved in either the printer profile at the cloud-based server, or a database at a local managing server data.

5. The method of claim 1, further comprising updating the printer profile when a new printing device is added or an existing printing device is deleted based on collected data sent from the at least one desktop client.

6. The method of claim 1, further comprising registering an application of a document that is not normally recognized by the cloud-based server.

7. The method of claim 1, further comprising:
    checking for a model the document associated with the print job is printed to;
    checking the cloud-based server for a list of printer profiles that match the model being printed to;
    checking a specific document format of the document associated with the print job that is supported by the number of printing devices; and
    presenting a list of print options to a user.

8. The method of claim 7, wherein the suitable printing device includes an application to print the specific document format and a printer driver that supports the print options.

9. The method of claim 8, wherein when the suitable printing device is within a same network of the desktop client, the desktop client sends the print job to the matching printing device for executing.

10. The method of claim 8, wherein when the suitable printing device is not within a same network of the desktop client, the desktop client downloads the print job from the cloud-based server and sends the print job to the matching printer for execution.

11. A system for distributing and controlling print jobs among a number of printing devices, the system comprising:
    a cloud-based server, comprising a storage for storing a number of documents that is accessible and printable by the number of printing device;
    the number of printing devices, including at least one un-registered printing devices of the cloud-based server and at least one registered printing devices of the cloud-based server, wherein the at least one registered printing device is installed with a desktop client application, and the desktop client application is configured to cause the registered printing device to collect data, manage and execute a print job in a print job queue; and
    wherein the at least one registered printing device comprises a processor in communication with the number of printing devices, and a memory coupled to and readable by the processor, the memory storing a set of program instructions which, when executed by the processor, configures the processor to
    collect printer driver capabilities of the at least one registered printing device;
    create a printer profile for each of the at least one registered printing device based on the collected printer driver capabilities;
    save the printer profile of the at least one registered printing device to the cloud-based server;
    scan a print job queue;
    search the printer profiles saved in the cloud-based server and applications supported by the at least one registered printing device that are suitable to perform a print job in the print job queue; and download a document saved in the storage corresponding the print job to a suitable printing device for printing.

12. The system of claim 11, further comprises at least one desktop client, wherein the at least one desktop client is a computing device that communicates with the cloud-based server and the at least one un-registered printing device to collect data and provides commands, and wherein the at least one desktop client comprises a processor in communication with the number of printing devices, and a memory coupled to and readable by the processor, the memory storing a set of program instructions which, when executed by the processor, configures the processor to
- collect printer driver capabilities of the at least one un-registered printing device;
- create a printer profile for each of the at least one un-registered printing device based on the collected printer driver capabilities;
- save the printer profile of the at least one un-registered printing device to the cloud-based server;
- scan the print job queue;
- search the printer profiles saved in the cloud-based server and applications supported by the at least one un-registered printing device that are suitable to perform the print job in the print job queue; and
- download a document saved in the storage corresponding to the print job to a suitable un-registered printing device for printing.

13. The system of claim 12, wherein the processor of the at least one desktop client and the processor of the at least one registered printing device further register an application for a document format not normally recognized by the number of printing devices when the application is detected.

14. The system of claim 12, wherein the number of documents saved in the storage of the cloud-based server is uploaded by either the at least one desktop client or the at least one registered printing device.

15. The system of claim 12, wherein the processor of the at least one desktop client is further configured to:
- upload documents corresponding to the print jobs in the print job queue to the cloud-based server;
- update the printer profiles stored in the cloud-based server based on data collected from at least one un-registered printing device; and
- update statuses of the at least one un-registered printing device of availabilities for executing print jobs in the print job queue.

16. A desktop client communicating with a cloud-based server and a number of printing devices for managing print jobs between the number of printing devices, the desktop client comprising: a processor in communication with the number of printing devices, and a memory coupled to and readable by the processor, the memory storing a set of program instructions which, when executed by the processor, configures the processor to
- collect printer driver capabilities of the number of printing devices;
- create a printer profile for each of the number of printing devices based on the collected printer driver capabilities;
- save the printer profile of each of the number of printing devices to the cloud-based server;
- scan a print job queue;
- search the printer profiles saved in the cloud-based server and applications supported by the number of printing device that are suitable to perform a print job in the print job queue; and
- send a document corresponding the print job to a suitable printing device for printing,
wherein the processor is further configured to:
- upload documents corresponding to the print jobs in the print job queue to the cloud-based server;
- update the printer profiles stored in the cloud-based server based on data collected from the number of printing devices; and
- update statuses of the at least one un-registered printing device of availabilities for executing print jobs in the print job queue.

17. The desktop client of claim 16, wherein the desktop client is further configured to
- check for a model the document associated with the print job is printed to;
- check the cloud-based server for a list of printer profiles that match the model being printed to;
- check a specific document format of the document associated with the print job that is supported by the number of printing devices; and
- present a list of basic and advanced print options to a user.

18. The desktop client of claim 16, wherein the suitable printing device is determined by wherein the suitable printing device includes an application capable of printing a specific document format of the document associated with the print job, and a printer driver that supports print options.

* * * * *